United States Patent [19]

Bains

[11] Patent Number: 4,930,125

[45] Date of Patent: May 29, 1990

[54] MULTIPLEXER FRAME SYNCHRONIZATION TECHNIQUE

[75] Inventor: Kuldip S. Bains, Watertown, Conn.

[73] Assignee: General DataCom, Inc., Middlebury, Conn.

[21] Appl. No.: 304,015

[22] Filed: Jan. 30, 1989

[51] Int. Cl.$^5$ .................................. H04J 3/06
[52] U.S. Cl. ........................ 370/105; 370/105.1; 375/116
[58] Field of Search ............ 370/100, 105, 106, 100.1, 370/105.1, 105.2, 105.4; 375/114, 116

[56] References Cited

U.S. PATENT DOCUMENTS

| | | | |
|---|---|---|---|
| 4,107,608 | 8/1978 | Saburi | 370/100 |
| 4,740,962 | 4/1988 | Kish, III | 370/100 |
| 4,764,921 | 8/1988 | Graves et al. | 370/100 |
| 4,811,367 | 3/1989 | Tajika | 375/116 |
| 4,847,877 | 7/1989 | Besseyre | 375/116 |

Primary Examiner—Douglas W. Olms
Assistant Examiner—Melvin Marcelo
Attorney, Agent, or Firm—David P. Gordon

[57] ABSTRACT

Methods for quickly determining loss of synchronization and for quickly reestablishing synchronization of a sub-aggregate frame having primary and secondary frames and contained within an independently synchronized aggregate are provided. In determining loss of synchronization, synch bits are located in the secondary frame such that when the composite subaggregate frame is synchronized the synch bits are chosen to be inserted into the same predetermined position in the aggregate. The synch bits are provided with values such that a collection of synch bits of a composite frame provides an internally non-repeating pattern. By comparing bit values received in the predetermined location of the aggregate at the synch bit rate with the non-repeating pattern, a determination is made as to whether synchronization has been lost. To reestablish synchronization, during data receipt, the bits located in the predetermined synch bit location in the aggregate frame are sequentially inserted into a number of buffers, the number being equal to the frame rate of the subaggregate divided by the synch rate of the synch bits. Then, upon loss of synchronization, a local pointer value is stored upon receipt of a synch bit candidate, the bit patterns in the buffers are scanned to find the buffer containing the internally non-repeating synch pattern, and a pointer correction indication is determined by comparing the local pointer value to a system pointer value dictated by the buffer found to contain the synch bits, and the phase of the internally non-repeating synch pattern in that buffer.

16 Claims, 2 Drawing Sheets

MULTIPLEXER FRAME SYNCHRONIZATION TECHNIQUE

BACKGROUND

The present invention generally relates to synchronization techniques for synchronizing the frames of a sending and a receiving multiplexer and for recognizing an out of synch condition. More particularly, the present invention relates to a frame synchronization technique which permits a user to specify the speed at which out of synchronization recognition is to be achieved, including a determination within one frame length, as well as to a technique which permits resynchronization to be achieved expeditiously.

When data from several channels are multiplexed over an aggregate line, it is necessary on the receiving end to divide (i.e. to demultiplex) the data into corresponding channel components so that the data reach proper destinations. The data are governed according to a frame format which permits the demultiplexer to know to which channel a received bit or byte belongs. A common frame format for telecommunications is the DS1 frame format for sending over a T1 aggregate line. In a DS1 frame, a group of one-hundred ninety-three bits of information are sent as a frame at a frame rate of 8 Khz. One of those bits is a DS1 overhead bit which includes DS1 frame synchronization information. The remaining one hundred ninety-two bits are typically divided up into up to twenty-four subaggregates (DS0's). Each subaggregate draws data from the primary frame of a multiplexer which in turn draws data from a secondary frame. The combination of the primary and secondary frames (i.e. the sequence which finally repeats) is known as the composite frame.

Various synchronization techniques ("synchronization technique" including both methods for recognizing loss of synchronization as well as methods for establishing synchronization) for aggregates as well as for composite frames are known to those skilled in the art. A typical synchronization procedure for a composite frame allocates a single "synch bit" in the non-repeating secondary frame. The use of a single bit, however, limits the speed at which the loss of synchronization can be detected regardless of the synchronization scheme, as the synch rate is limited to the rate of the non-repeating frame. As a typical non-repeating frame rate is 25 Hz, and because a minimum of eight incorrect bits are usually required to establish an out of frame condition, where a single secondary frame synch bit is used, a minimum of 320 milliseconds would be required to recognize an out of synch condition. Of course, such a relatively large time of misdirecting data is undesirable. Moreover, in reestablishing synchronization, it is often necessary for several frames of information to be utilized before the synch bits can be identified.

Other synchronization schemes permit loss of synchronization to be detected more quickly. Such schemes allocate additional bandwidth to synchronization. In these schemes, a plurality of adjacent synch bits are formed into a word (sometimes designated as a "preamble") which typically permits an out of synch determination to be made within the time frame of two composite frames. Similarly, the reestablishing of synchronization is relatively quickly accomplished.

While synchronization of the aggregate (DS1 frame) itself is not within the scope of the instant invention, it is important to note that when the aggregate line loses synchronization, the synchronization of all of the subaggregates is lost. Thus, upon regaining aggregate synchronization, it is necessary to quickly synchronize all of the subaggregate frames, including both the primary and secondary frames.

SUMMARY OF THE INVENTION

It is therefore an object of the invention to provide a method for expeditiously recognizing the loss of synchronization of the composite frame of a subaggregate.

It is a further object of the invention to permit a user to specify the speed at which loss of synchronization is detected.

It is another object of the invention to provide a method for quickly establishing synchronization after loss of synchronization.

In accord with the objects of the invention, a method for determining loss of synchronization of a sub-aggregate frame comprised of a primary and secondary frame and contained within an independently synchronized aggregate generally comprises: locating a plurality of synch bits in the secondary frame such that said synch bits are evenly spaced in the primary frame; providing values for the synch bits in the secondary frame such that a collection of synch bits of a composite frame provides an internally non-repeating pattern; comparing bits received in a predetermined location of the independently synchronized aggregate at a synch rate of said synch bits with said internally non-repeating pattern; and determining from said compared bits whether synchronization has been lost.

Values for bits located in the predetermined synch bit location in the aggregate frame (i.e. synchronization bit candidates) should be sequentially inserted into a plurality of buffers during the data reception in order to expedite synchronization of the composite frame after synchronization has been lost. The number of buffers provided should be equal to the frame rate of the subaggregate divided by the synch rate of the synch bits. Then, upon establishing the loss of synchronization, the method for quickly reestablishing synchronization comprises: storing an indication of the local pointer value upon receipt of a synch bit candidate; comparing bit patterns of the buffers to find the buffer containing the internally non-repeating synch pattern; and determining a pointer correction indication by comparing the local pointer value to a system pointer value dictated by the buffer found to contain the synch bits, and the phase of the internally non-repeating synch pattern in that buffer.

In the preferred method, eight synch bits are equally distributed in the secondary frame. The synch bits take the form of literals in a RAM and are given the pattern 11110000. Also, in the preferred method, the local pointer value is ascertained from a primary frame pointer and a secondary frame pointer, while the buffer phase provides a secondary frame system pointer value and the buffer location provides a primary frame system pointer value.

Additional objects and advantages of the invention will become apparent to those skilled in the art upon reference to the detailed description in conjunction with the provided drawings.

DETAILED DESCRIPTION OF THE PREFERRED EMBODIMENT

Figure 1:
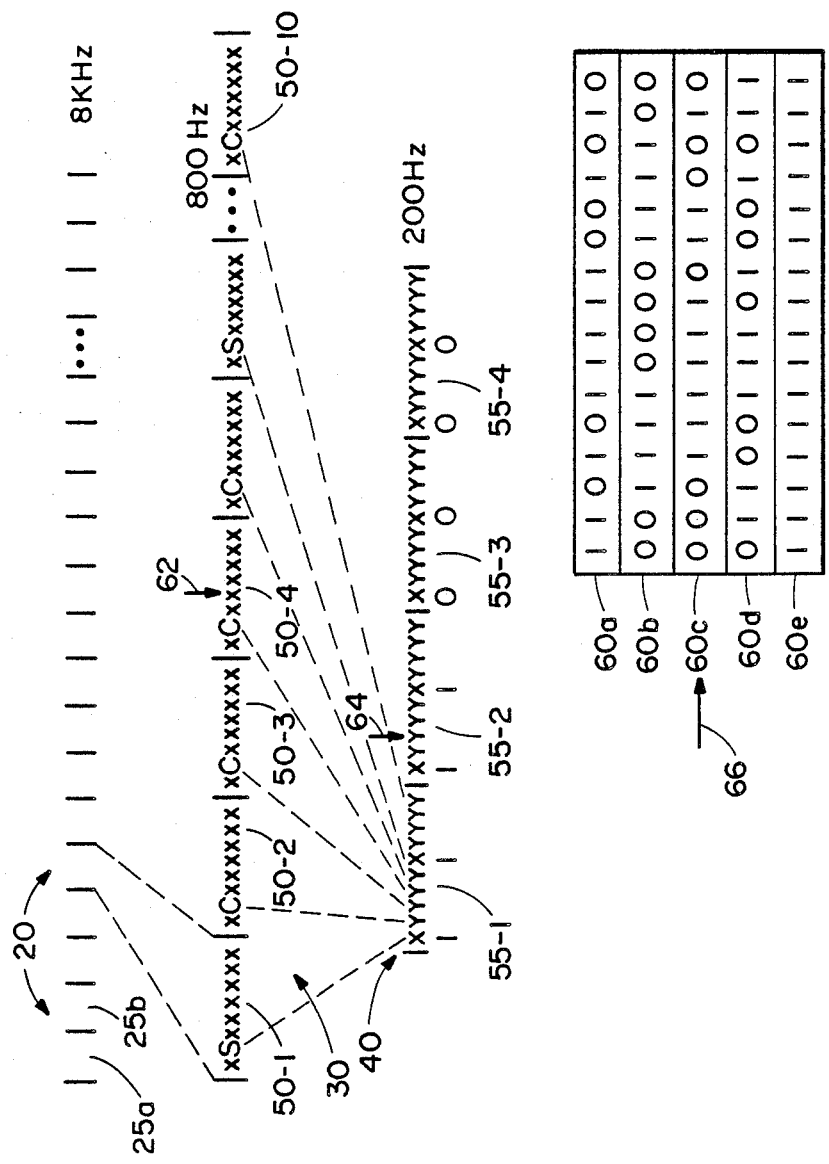
FIG. 1 is a diagram representing the relationships among the aggregate frame and the primary and secondary frames of the subaggregates comprising the aggregate frame, and showing a "snap-shot" diagram of pointers to the primary and secondary frames and of the data buffers which are used in the method for reestablishing synchronization.

Turning to FIG. 1, a DS1 frame 20 representing an aggregate is seen comprised of a plurality of subaggregates 25a, 25b, ... Typically, DS1 frames are comprised of one hundred ninety-three bits, each sampled at 8 Khz. The one hundred ninety-three bits include a single DS1 aggregate synchronization bit, and twenty-four eight bit DS0 words. Thus, up to twenty-four subaggregates 25 may be included in a DS1 frame.

A single subaggregate 25 itself is comprised from a composite frame which includes a "repeating" primary frame 30 and a "non-repeating" secondary frame 40. As seen in FIG. 1, the primary frame 30 includes N1 data blocks 50a, 50b. . . , with a single block 50 being inserted into the DS1 frame each time the DS1 frame calls for the primary frame 30. In turn, the primary frame 30 calls on the secondary frame 40 for "non-repeating" data. The secondary frame 40 is comprised of N2 data blocks 55a, 55b. . . , with all the bits of a single secondary frame data block 55 being inserted into desired locations of the primary frame such that all the bits of a single block are accessed during a single pass through the primary frame. Thus, the composite frame essentially comprises N1 times N2 blocks of data, and the DS1 frame must be repeated N1 times N2 times before the composite frame will repeat. Preferably, the bits of each block of the secondary frame are evenly distributed into the primary frame, although such an even distribution is not a requirement provided the synch bits of the secondary frame are evenly distributed in the composite frame as will be discussed hereinafter.

According to the invention, it is necessary for the synchronization bits located in the secondary frame to always appear in the same position in the DS1 aggregate frame. To guarantee this condition, the synch bits must be distributed into the primary frame in an evenly distributed manner; i.e. they must be an equal distance apart. Also, all blocks of the secondary frame should have the same number of bits, and if more than one synch bit is to appear in each block of the secondary frame, each secondary frame block should have an even number of synch bits. Also, according to the invention, the values of the synch bits inserted into the secondary frame must assume a non-repeating pattern. For example, a two bit pattern would be 01 or 10, a four bit pattern could be 1100 or phases thereof (0110, 0011, 1001) or 1101 or 0010 or phases thereof. A preferred eight bit pattern is 11110000 (or phases thereof), while preferred patterns having more than eight bits are based on the eight bit pattern with the first eight bits assuming the 11110000 arrangement and each following eight bit segment having least significant bits indexing which eight bit segment it is. For example, a sixteen bit pattern would be 1111000011110001, while a thirty-two bit pattern would be 11110000111100011111001011110011. Also, according to another aspect of the invention, the synch pattern is preferably inverted in consecutive composite frames to prevent the possibility of a regularly repeated transmitted pattern from coinciding with the chosen synch pattern. If synch pattern inversion is to be utilized, care must be taken when choosing a synch pattern to make sure that the inversion does not introduce a repeating pattern within the synch pattern. A four bit synch pattern satisfying these conditions would be 1101 which would be inverted during the next composite frame to 0010, thus providing a non-repeating eight bit pattern 11010010 over two composite frames.

With the synchronization bits so arranged in the secondary frame, a determination of whether a particular subaggregate is synchronized may be made at a receiving end which is receiving the particular subaggregate from the DS1 aggregate information. The expected subaggregate synch bit location in the DS1 frame is monitored, and by knowing the synch rate and the primary frame and DS1 frame rates, the received bits are monitored to see whether the desired bit pattern is received. Particular methods of making an out-of-synch determination utilizing correlation, autocorrelation, or other techniques are well known and will not be discussed herein. Suffice it to say, however, that by distributing the synchronization bits throughout the composite frame, an out-of-synch determination can be made in the time frame of one composite frame length if enough synch bits (e.g. typically eight for autocorrelation techniques) are properly placed in the secondary frame.

The method for reestablishing synchronization takes advantage of the even distribution of the synch bits in the composite frame as well as taking advantage of the synch pattern provided to those bits. In particular, a plurality of buffers are used to hold synch bit candidates as they are received in the DS1 frame. The number of buffers required is equal to the sub-aggregate rate divided by the synchronization data rate. For example, where the DS1 aggregate with DS0 sub-aggregates is used, with the DS0's at a rate of 8000 Hz, and a synch rate of 800 Hz is utilized, ten synch candidate buffers would be required. Where the synch rate is at 400 Hz, twenty such buffers would be required.

Where the aggregate, primary frame, secondary frame, and synch rates are all set, the number of blocks in each frame, and the number of synch bits in the secondary frame are determinable. For example, with a sub-aggregate rate of 8000 Hz, a primary frame rate of 800 Hz, a secondary frame rate of 200 Hz, and a synch rate of 1600 Hz, there would be ten blocks in the primary frame (8000/800), and four blocks in the secondary frame (800/200) (for a total of forty blocks in the composite frame), and eight synch bits (1600/200) would have to appear in the four blocks of the secondary frame.

On the other hand, with a sub-aggregate rate of 8000 Hz, a primary frame rate of 800 Hz, a secondary frame rate of 25 Hz, and a synch rate of 200 Hz, there would be ten blocks in the primary frame (8000/800), and thirty-two blocks in the secondary frame (800/25) (for a total of three hundred and twenty blocks in the composite frame), and eight synch bits (200/25) would have to appear in the thirty-two blocks of the secondary frame. Thus, a synch bit would in appear in every fourth block of the secondary frame in an evenly distributed manner. With eight synch bits appearing in three hundred and twenty blocks, it will be appreciated that only one in forty synch bit candidates (i.e. bits appearing at a location in the aggregate frame where the sub-aggregate synch bit will appear) will actually be the synch bit.

Thus, forty buffers (8000/200) are utilized in the method for reestablishing synchronization.

By supplying the appropriate number of buffers, and forwarding each synch bit candidate cyclically to the buffers, the actual synch bits will all appear in a single buffer regardless of synchronization, provided, of course, that the aggregate is in synch. The particular buffer the synch bits appear in is found by scanning the bits for the predetermined non-repeating pattern. With a knowledge of the buffer number in where the synch bits appear, and a knowledge of the phase of the non-repeating pattern in the buffer, a determination of the exact location in the composite frame is obtained. By comparing those values to where in the composite frame the obtained bits are actually being located (as indicated by pointers to the primary and secondary frames), a determination of the pointer offsets can be made so that synchronization can be reestablished. More particularly, in attempting to reestablish synchronization, on the receiving end, when a synch bit candidate is received over the aggregate, a "snap-shot" of the primary and secondary frame pointer values is taken. These values provide the location in the primary and secondary frames (and hence the composite frame) to which the synch bit candidate is being written. In other words, a location within a particular primary frame block and a location within a particular secondary frame block are noted as receiving the synch bit candidate. At the same time that the locations are noted, the synch bit candidate is written to one of the buffers which cyclically receive the synch bit candidates. By comparing the number (or location) of the buffer with the number of the buffer containing the actual synch bits (as found by finding the predetermined pattern), an indication is given as to how many blocks from the block containing the true synch bit the primary pointer should be. If the primary frame pointer is at a different location, then there is loss of synchronization, and the pointer must be adjusted to reflect the information determined from the buffers.

The secondary frame pointer offset is determined by comparing the location of the secondary frame pointer to the phase of the framing pattern found in the buffer. For example, where the framing pattern is 11110000, and the last eight bits of the buffer (read from least recent to most recent) is 11000011, an indication is provided that the first two bits of the framing sequence have been received. Thus, the secondary pointer should be pointing to the second synch bit in the secondary frame. If the pointer is not properly located, a loss of secondary frame synchronization is indicated, and the pointer must be adjusted to reflect the information contained by the phase of the framing pattern.

Returning to FIG. 1, the method of reestablishing sychronization by using the primary and secondary frame pointers and the buffer and phase information is illustrated. As illustrated, the primary frame has a rate of 800 Hz, the secondary frame has a rate of 200 Hz, and the synchronization rate is set at 1600 Hz. With a subaggregate rate of 8 KHz, the primary frame has ten blocks 50-1, 50-2, ..., 50-10. With a primary frame rate of 800 Hz and a secondary frame rate of 200 Hz, the secondary frame has four blocks 55-1, 55-2, 55-3, and 55-4. With a subaggegate rate of 8 KHz, and a synch rate of 1600 Hz, five buffers 60a, 60b, ..., 60e are utilized. Also with a secondary frame rate of 200 Hz and a synch rate of 1600 Hz, the secondary frame includes eight sync bits. The eight synch bits are distributed in the secondary frame and are given values according to the framing sequence 11110000. As indicated in FIG. 1, the primary frame makes ten calls to the secondary frame during one full run through the primary frame. Of the ten received bits, the first and sixth are always the synch bits. The calls are made from the second location in each block of the primary frame.

At a given moment in time, when the receiving multiplexer receives a bit of the subaggregate in a location in the frame which should eventually yield a synch bit, the location of the primary frame pointer 62, secondary frame pointer 64 and buffer pointer 66 are found. As shown in FIG. 1, at that instant, primary frame pointer 62 is not pointing to a call to the secondary frame, but is pointing to the fourth bit of the fourth block 50-4. The secondary frame pointer 64 is similarly not pointing to a synch bit, but is pointing to the third bit of the second block 55-2. The buffer pointer 66 is pointing to buffer 60c.

By scanning the buffers, it will be seen that buffer 60b contains the synch pattern. Thus, the synch bits being received are actually being written into buffer 60b. That pointer 66 points to buffer 60c indicates that the synch bit candidate received when the "snap-shot" was taken, was a bit one block after an actual synch bit was received. Thus, pointer 62 should have been pointing to the candidate bit in either primary frame block 50-2 or 50-7, rather than pointing to a non-candidate bit in block 50-4. Further, it can be seen that the phase of the framing pattern in buffer 60b is indicative of the fact that the last time a synch bit was received, it was the sixth bit of the eight bit pattern. Thus, the primary frame pointer 62 should have been pointing to the identified candidate bit in primary frame block 50-7, as an "even" phase is indicative of the second synch call in the primary frame. Similarly, the secondary frame pointer 64 should be pointing to the the first candidate after the sixth synch bit in its frame; i.e. the sixth bit of block 55-3. With a knowledge of where the pointers should be pointing based on the buffer pointer and the phase and location of the synch pattern in the buffers, the primary and secondary frame pointers 62 and 64 can be adjusted according to techniques known in the art.

Figure 2:
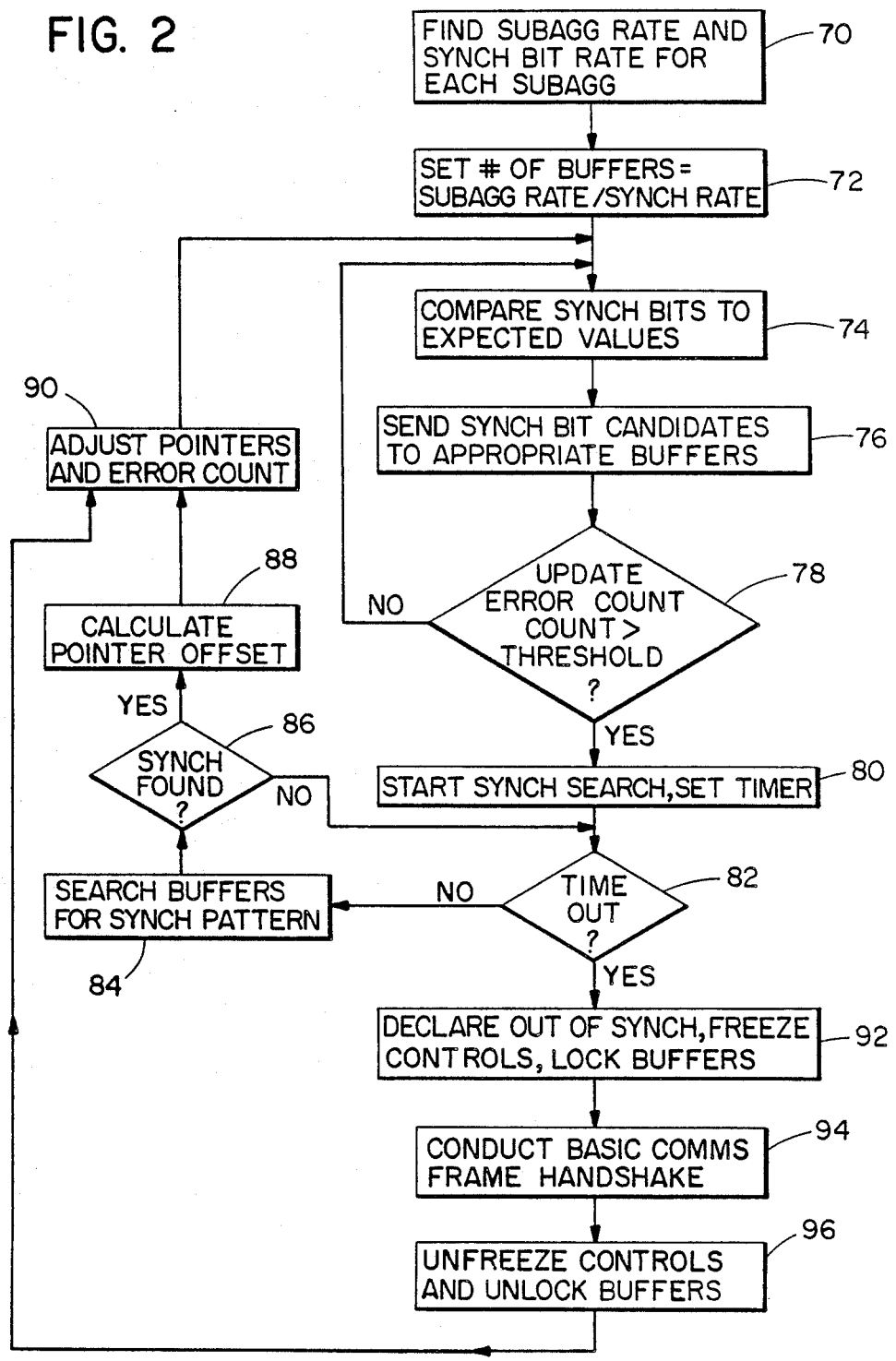
FIG. 2 is a flow chart of the preferred methods for determining loss of synchronization and for reestablishing synchronization in accord with the invention.

Turning to FIG. 2, the preferred method of determining loss of synchronization and reestablishing synchronization is shown. At 70, the subaggregate rate (typically 8 Khz) is defined, and the primary and secondary frame rates and the synch bit rate for each subaggregate are chosen. Based on the subaggregate rate and the synch bit rates, the numbers of buffers required for reestablishing synchronization for each subaggregate are set at 72. Also, at 72, the primary and secondary frames are set, with the secondary frame including an appropriate number of synch bits.

The synch bits are recognized as literals in the frame RAM and are assigned values according to a desired non-repeating synch pattern.

At 74 and 76, as the data is being received, the bits in the subaggregate frame which are expected to be synch bits are compared to their expected values, and all synch bit candidates are forwarded to appropriate buffers. At 78, an error count for the bits expected at 74 to be synch bits is kept in a desired manner. In particular, each time the received bit does not correspond to an expected value (i.e. an error), the error count is incremented by one. Also, at the start of every composite frame, the error count is decremented by one. As long as the error count does not exceed a predetermined threshold (typically set at a value of three, four, or five), synchronization is assumed to be maintained. However, when the error count exceeds the predetermined threshold, a timer is set at 80 and at 84 a synch search is conducted in the buffers (while transmission and receipt continue). If at 86 the synch pattern is found, the pointer offsets are calculated at 88, and the pointers are adjusted at 90. Concurrently at 90, the error count is returned to zero, and the data transmission continues uninterruptedly. If the synch pattern is not found at 86, and at 82 the time for finding the synch pattern has not expired, a search for the synch pattern continues until it is found or until time expires. Once the time has expired, the system is declared "out of synch" at 92, and the system controls are frozen, the buffers are locked, and data transmission/receipt is discontinued. The multiplexer then reverts at 94 to a start-up configuration where a basic communications frame handshake is conducted. Once the handshake is completed, the controls are unfrozen at 96 and the buffers are unlocked. The pointers are then adjusted at 90 to initialization values, and the error count is initalized to zero.

There has been described and illustrated herein methods for determining loss of synchronization of a composite subaggregate frame, and methods for reestablishing synchronization of the primary and secondary frames which comprise the composite subaggregate. While particular embodiments were discussed, it should be appreciated by those skilled in the art that it is intended that the invention be broad in scope and that the specifications be read likewise. Thus, for example, while primary frame and secondary frame pointers were described, it will be appreciated that a single (composite) frame pointer could be utilized and that the buffer pointer along with the synch pattern phase and location could be utilized to reestablish synchronization for that pointer. Further, to simplify matters, restrictions such as requiring that the snap-shot be made at the expected location of a synch bit (as opposed to synch candidate) could be made. Other restrictions might include the rates of the primary and secondary frame as well as the absolute synch rate or the synch rate in relation to the primary and secondary frame rates.

It should also be appreciated that while a particular technique for deciding an out-of-synch condition was described, other methods could be utilized which might more quickly recognize an out-of-synch condition. Of course, such methods might also prematurely declar out-of-synch where a short burst of line noise corrupted the bits. Thus, a trade-off between speed and accuracy is established, and those skilled in the art will be free to establish their own criteria. The method of the invention, however, provides the synch data in an evenly distributed manner, and thus permits a quicker determination of loss-of-synch, regardless of the criteria utilized. Further, while certain synch rates were discussed in the specification, a user could choose a desired synch rate based on particular system requirements. Thus, many different synch rates can be accommodated, provided of course that two or more synch bits occur in the secondary frame.

Therefore, it will be apparent to those skilled in the art that additional modifications can be made to the described invention without deviating from the scope and spirit of the invention as so claimed.

I claim:

1. A method for determining loss of synchronization of a composite subaggregate frame comprised of a primary and secondary frame and contained within an independently synchronized aggregate, said method comprising:
    (a) locating a plurality of synch bits in said secondary frame such that said synch bits are evenly spaced in the primary frame and such that when said composite subaggregate frame is synchronized said synch bits are chosen to be inserted into the same predetermined position in said independently synchronized aggregate;
    (b) providing values for the synch bits in the secondary frame such that a collection of said synch bits of a composite frame provides an internally non-repeating pattern;
    (c) collecting bits located in said predetermined location of the independently synchronized aggregate at predetermined intervals; and
    (d) determining whether the values of the collected bits correspond to the bit values of said non-repeating pattern.

2. A method according to claim 1, further comprising:
    (e) counting the number of times a collected bit value does not correspond to the expected value in said non-repeating pattern to provide a count value.

3. A method according to claim 2, wherein:
    loss of synchronization is determined when said count value reaches a predetermined threshold.

4. A method according to claim 2, wherein:
    said count value is decremented once every said composite aggregate frame, and loss of synchronization is determined when said count value reaches a predetermined threshold.

5. A frame synchronization method for synchronizing the frame of a subaggregate contained within an independently synchronized aggregate frame, wherein said subaggregate frame is comprised of a primary and secondary frame, said synchronization method comprising:
    (a) locating a plurality of synch bits in said secondary frame such that said synch bits are evenly spaced in said primary frame and such that when said composite subaggregate frame is synchronized said synch bits are chosen to be inserted into the same predetermined position in said independently synchronized aggregate;
    (b) providing said plurality of synch bits with values such that a collection of synch bits for one secondary frame length provides an internally non-repeating pattern;
    (c) providing a plurality of buffers equal to the frame rate of said subaggregate frame divided by the synch rate of said plurality of synch bits;
    (d) during reception of data, collecting all bits located in the predetermined synch bit location in the aggregate frame, and sequentially inserting the collected bits into the plurality of buffers;
    (e) upon receipt of a bit in the predetermined synch bit location upon an indication of loss of synchronization, storing an indication of at least one local pointer value;
    (f) comparing bit patterns of said plurality buffers and said internally non-repeating pattern to find the buffer containing said internally non-repeating synch pattern;
    (g) determining a pointer correction indication by comparing said local pointer value to a system pointer value dictated by the buffer found to contain the synch bits and the phase of the internally non-repeating synch pattern in that buffer.

6. A method according to claim 5, wherein:

said at least one local pointer value comprises a local primary frame pointer and a local secondary frame pointer;

said phase of the internally non-repeating synch pattern corresponds to a system location in said secondary frame; and said buffer containing the synch bits corresponds to a system location in said primary frame.

7. A method according to claim 6, wherein:

said pointer correction indication is obtained by comparing said system location in said primary frame to said local primary frame pointer and by comparing said system location in said secondary frame to said local secondary frame pointer.

8. A method according to claim 5, further comprising:

(h) adjusting said subaggregate frame within said independently synchronized frame in accord with said pointer correction indication.

9. A method according to claim 5, wherein:

said independently synchronized frame is a frame of a DS1 signal.

10. A method according to claim 9, wherein said frame of said DS1 signal is comprised of a plurality of subaggregate frames, each respective subaggregate frame being synchronized according to steps a-g.

11. A method according to claim 5, wherein:

said plurality of synch bits comprises eight synch bits.

12. A method according to claim 11, wherein:

said non-repeating pattern is a phase of 11110000.

13. A method according to claim 5, wherein:

said plurality of synch bits comprise sixteen bits and said non-repeating pattern is a phase of 1111000011110001.

14. A method according to claim 11, wherein:

said synch bits are literals in said secondary frame.

15. A method according to claim 5, wherein:

each composite frame said synch bit pattern is inverted, wherein the synch bit pattern formed over two consecutive composite frames is internally non-repeating.

16. A method according to claim 15, wherein:

said plurality of synch bits comprises four bits, and said non-repeating pattern formed over two consecutive composite frames is 11010010.

* * * * *